United States Patent
Green et al.

(10) Patent No.: US 9,322,515 B2
(45) Date of Patent: Apr. 26, 2016

(54) APPARATUS FOR CONTROLLING THE RE-DISTRIBUTION OF LIGHT EMITTED FROM A LIGHT-EMITTING DIODE

(75) Inventors: John R. Green, Seattle, WA (US); Stephen H. Humphrey, Lynnwood, WA (US); Andrew B. Leslie, Seattle, WA (US); Timothy R. Robinson, Lake Forest Park, WA (US)

(73) Assignee: Korry Electronics Co., Everett, WA (US)

( * ) Notice: Subject to any disclaimer, the term of this patent is extended or adjusted under 35 U.S.C. 154(b) by 220 days.

(21) Appl. No.: 13/172,617

(22) Filed: Jun. 29, 2011

(65) Prior Publication Data

US 2013/0003383 A1 Jan. 3, 2013

(51) Int. Cl.

| | |
|---|---|
| *F21V 7/04* | (2006.01) |
| *F21K 99/00* | (2010.01) |
| *G02B 5/02* | (2006.01) |
| *F21V 5/00* | (2015.01) |
| *F21V 19/00* | (2006.01) |
| *F21Y 101/02* | (2006.01) |
| *F21V 29/89* | (2015.01) |

(52) U.S. Cl.
CPC ... *F21K 9/10* (2013.01); *F21V 5/00* (2013.01); *F21V 19/0055* (2013.01); *G02B 5/0242* (2013.01); *G02B 5/0278* (2013.01); *G02B 5/0294* (2013.01); *F21V 29/89* (2015.01); *F21Y 2101/02* (2013.01)

(58) Field of Classification Search
CPC .. G02B 5/0242; G02B 5/0278; G02B 5/0294; G02B 5/206

USPC ........... 362/257, 259, 317, 335, 336, 311.02, 362/311.03, 311.06, 650
See application file for complete search history.

(56) References Cited

U.S. PATENT DOCUMENTS

| | | | |
|---|---|---|---|
| 3,780,357 A | 12/1973 | Haitz | |
| 3,833,288 A | 9/1974 | Nilsson | |
| 4,152,624 A | 5/1979 | Knaebel | |
| 4,675,575 A | 6/1987 | Smith et al. | |
| 4,780,752 A | 10/1988 | Angerstein et al. | |
| 6,568,834 B1 | 5/2003 | Scianna | |
| 7,021,797 B2 | 4/2006 | Miñano et al. | |
| 7,319,293 B2 | 1/2008 | Maxik | |
| 7,530,710 B2 | 5/2009 | Berben et al. | |
| 7,588,351 B2* | 9/2009 | Meyer | 362/294 |
| 7,688,583 B1 | 3/2010 | Arik et al. | |
| 7,695,166 B2 | 4/2010 | DeRose | |
| 7,753,561 B2 | 7/2010 | Chaves et al. | |

(Continued)

OTHER PUBLICATIONS

International Search Report mailed Jan. 23, 2013, of PCT Application No. PCT/US2012/044360 filed Jun. 27, 2012.

(Continued)

*Primary Examiner* — Peggy Neils
*Assistant Examiner* — Alexander Garlen
(74) *Attorney, Agent, or Firm* — Perkins Coie LLP

(57) ABSTRACT

A system for re-distributing light emitted from a light source using an optical element is described. The optical element is manufactured using a bulk matrix material, and diffusing particles and/or scattering particles are embedded within the bulk material. The optical element is coupled to the light source to capture emitted light and redistribute the light in a desired angular distribution pattern depending on the ratio of total weight of diffusing particles to total weight of scattering particles.

24 Claims, 9 Drawing Sheets

(56) References Cited

U.S. PATENT DOCUMENTS

| | | | |
|---|---|---|---|
| 8,322,896 B2* | 12/2012 | Falicoff et al. | 362/363 |
| 8,360,604 B2* | 1/2013 | Negley et al. | 362/235 |
| 8,360,622 B2* | 1/2013 | Mora et al. | 362/498 |
| 8,414,151 B2* | 4/2013 | Allen et al. | 362/249.02 |
| 8,456,077 B2* | 6/2013 | Diamantidis | 313/503 |
| 8,506,103 B2* | 8/2013 | Iimura et al. | 362/84 |
| 2003/0038596 A1 | 2/2003 | Ho | |
| 2007/0267976 A1* | 11/2007 | Bohler et al. | 315/112 |
| 2008/0123031 A1 | 5/2008 | Homma et al. | |
| 2008/0205035 A1 | 8/2008 | Asvadi et al. | |
| 2009/0067179 A1 | 3/2009 | Chaves et al. | |
| 2009/0168419 A1 | 7/2009 | Daimon | |
| 2009/0225529 A1 | 9/2009 | Falicoff et al. | |
| 2010/0265707 A1 | 10/2010 | Van Herpen et al. | |
| 2010/0270567 A1 | 10/2010 | Emerson et al. | |
| 2010/0289395 A1 | 11/2010 | Sun et al. | |
| 2010/0296281 A1 | 11/2010 | Hofmann | |
| 2010/0309668 A1 | 12/2010 | Fluhrer | |
| 2011/0080740 A1* | 4/2011 | Allen et al. | 362/294 |
| 2011/0080742 A1* | 4/2011 | Allen et al. | 362/294 |
| 2011/0198984 A1* | 8/2011 | Van De Ven | 313/318.01 |
| 2011/0216523 A1* | 9/2011 | Tong et al. | 362/84 |
| 2012/0020082 A1 | 1/2012 | Shinohara | |
| 2012/0020083 A1* | 1/2012 | Tukker et al. | 362/235 |
| 2012/0155059 A1* | 6/2012 | Hoelen et al. | 362/84 |
| 2012/0224363 A1* | 9/2012 | Van De Ven | 362/231 |

OTHER PUBLICATIONS

Written Opinion mailed Jan. 23, 2013, of PCT Application No. PCT/US2012/044360 filed Jun. 27, 2012.

GE Energy Smart © 9W LED Lamp, "Under the Hood", pp. 1-12, Copyright © 2011 SevenGens Labs, http://www.sevengens.com/sitebuildercontent/sitebuilderfiles/ge_energy_smart_led_analysis020211a.pdf.

creativelightings.com, "Incandescent LED Replacement Light Bulbs", http://www.creativelightings.com/Incandescent-LED-Replacement-Light-bulbs-s/34.htm, pp. 1-3, May 10, 2011.

LED Illumination Inc., "Lighting for a Cleaner World", 2 pages, Copyright © 2009-2011 LED Illumination Inc., http://www.ledil-luminationinc.com/household.html.

* cited by examiner

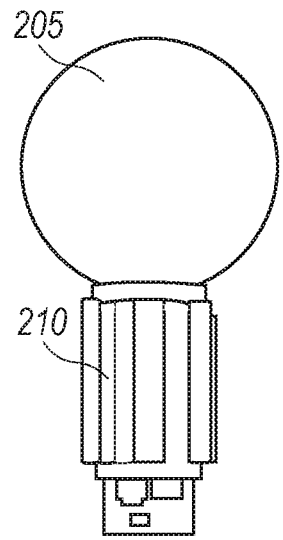
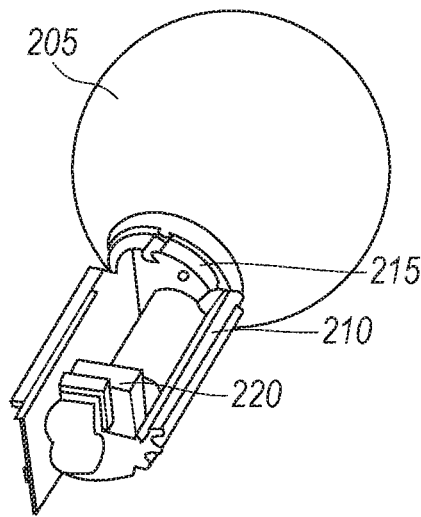
Fig. 2A    Fig. 2B
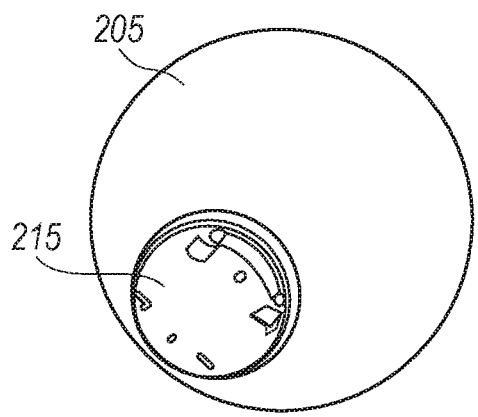
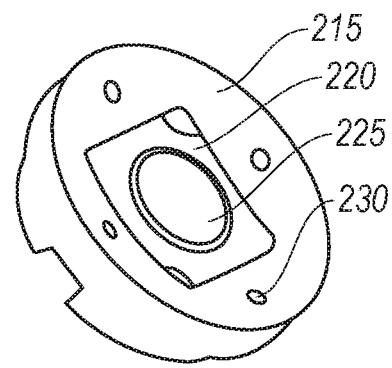
Fig. 2C    Fig. 2D

APPARATUS FOR CONTROLLING THE RE-DISTRIBUTION OF LIGHT EMITTED FROM A LIGHT-EMITTING DIODE

BACKGROUND

Solid-state light emitting diodes (LEDs) have greatly improved over the last several years. In fact, LEDs outperform the A19 incandescent light bulb in terms of lifetime and efficiency. As a result, LEDs are candidates for replacing the commonly used, yet inefficient, incandescent light bulbs for general lighting applications. However, surface-mount LEDs emit light in a substantially Lambertian pattern which is much more directional than the quasi-isotropic light emitted from an incandescent light bulb.

BRIEF DESCRIPTION OF THE DRAWINGS

Examples of an apparatus for redistributing light emitted from a source are illustrated in the figures. The examples and figures are illustrative rather than limiting.

FIGS. 2A-2D show different views of an example LED-based lamp assembly that uses an optical element to angularly redistribute the light emitted by the LED.

DETAILED DESCRIPTION

An apparatus is described for capturing the light emitted from a light source and redistributing the light in a different emission pattern from that of the light source. The apparatus is made from a bulk matrix material that can have two different types of particles embedded within the material, diffusing particles and scattering particles. By varying the concentrations of the two types of particles, the angular emission of the redistributed light can be tuned. In one embodiment, the Lambertian emission from a light emitting diode (LED) is angularly redistributed to simulate the emission from a typical incandescent light bulb.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1A:
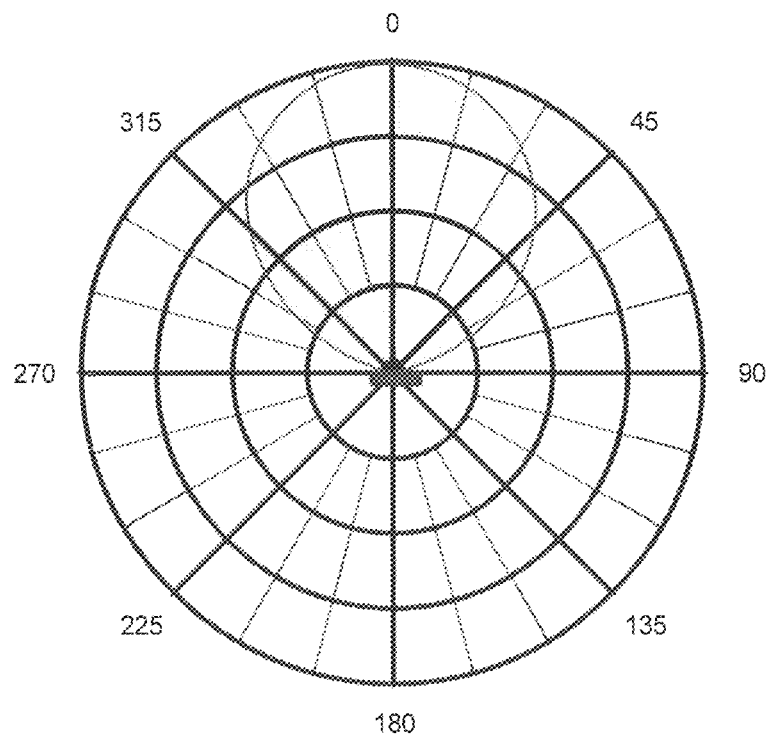
FIG. 1A shows a typical spatial distribution of the emission from a light-emitting diode (LED).

A surface mount LED is typically used in lighting applications and emits light in a Lambertian pattern. The intensity of the emitted Lambertian light is given by the equation: $I=I_0 \cos(\theta)$, where $I_0$ the intensity emitted in a forward direction normal to the light source, and $\theta$ is the observation angle. FIG. 1A shows a cross-section of a normalized angular light distribution pattern from a surface mount LED. The distribution pattern is rotationally symmetric about the line corresponding to $\theta=0°$. In the forward direction above the LED at $\theta=0$ the LED emits a maximum amount of light, and towards the sides of the LED at $\theta=90°$ and $270°$, no light is emitted. Further, no light is emitted behind the LED, where $\theta$ is less than $270°$ and greater than $90°$.

Figure 1B:
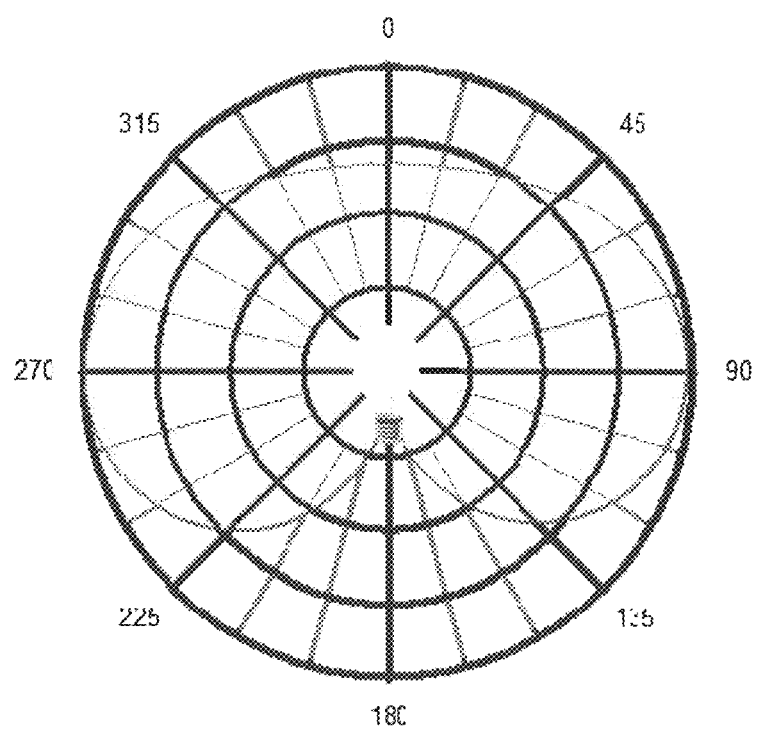
FIG. 1B shows a typical spatial distribution of the emission from an incandescent light bulb.

In contrast, a standard A19 incandescent light bulb emits light having a quasi-isotropic distribution. A cross-section of a normalized distribution is shown in FIG. 1B. The incandescent bulb emits a substantial amount of light in a forward direction above the light bulb at $\theta=0$ and a maximum amount of light towards the sides at $\theta=90°$ and $270°$. The incandescent bulb emits light towards the underside of the bulb as well, for example at $\theta=135°$ and $225°$. Thus, an incandescent bulb emits light in a "quasi-isotropic" pattern.

While an LED has many advantageous qualities such as higher efficiency and a longer lifetime than an incandescent bulb, the directional light emission from an LED is noticeably different and would not be a suitable replacement for the incandescent bulb. For example, if an LED lamp were used in a table top light fixture, the light would be directed towards the ceiling and not towards a work surface situated below the light. Some of the embodiments of the apparatus presented below redistribute the light from an LED to imitate the quasi-isotropic distribution of light emitted from an incandescent bulb.

FIGS. 2A-2D show an example embodiment of an LED-based lighting assembly that redistributes the light emitted from one or more LEDs. The light emitted by the one or more LEDs can be in the visible spectrum. Additionally or alternatively, the light can be comprised of wavelengths that are not visible. FIG. 2A shows a side view of the example lamp assembly having a heat sink 210 for dissipating heat generated by the LED(s) and an optical element 205 coupled to the heat sink. The heat sink is made from a thermally conductive material such as aluminum. In this embodiment, the optical element 205 has been formed in a spherical shape having a diameter equal to the diameter of the spherical section of an A19 incandescent bulb to simulate the appearance and function of the incandescent bulb.

FIG. 2B shows a perspective view of the example lighting assembly with the heat sink 210 cut away to show that the optical element 205 is coupled to the heat sink through an LED holder 215. Also, FIG. 2B shows that the electronics 220 used for driving the LED are housed within the heat sink 210.

FIG. 2C shows a view of an example optical element 205 and the LED holder 215 without the heat sink 210 attached. FIG. 2D shows the example LED holder 215 detached from the optical element 205. The LED holder 215 is made from a thermally conductive material such as aluminum. Inside the LED holder 215 is the light source 225. The light source 225 can be, but is not limited to, a single LED, multiple LEDs placed in any configuration, or other light source technologies emitting light into a half-space. Such light sources may include, for example, LEDs, organic LEDs, electroluminescent sources, or lasers. In one embodiment, if the light source 225 is one or more LEDs, the LEDs can further be coated with an encapsulant containing phosphor(s) to generate light in a certain band of wavelengths. In one embodiment, the light source 225 is seated in a ceramic base 220. In one embodiment, the LED holder 215 is attached to the optical element 205 using screws that are placed in the through holes 230 in the LED holder.

Figure 9:
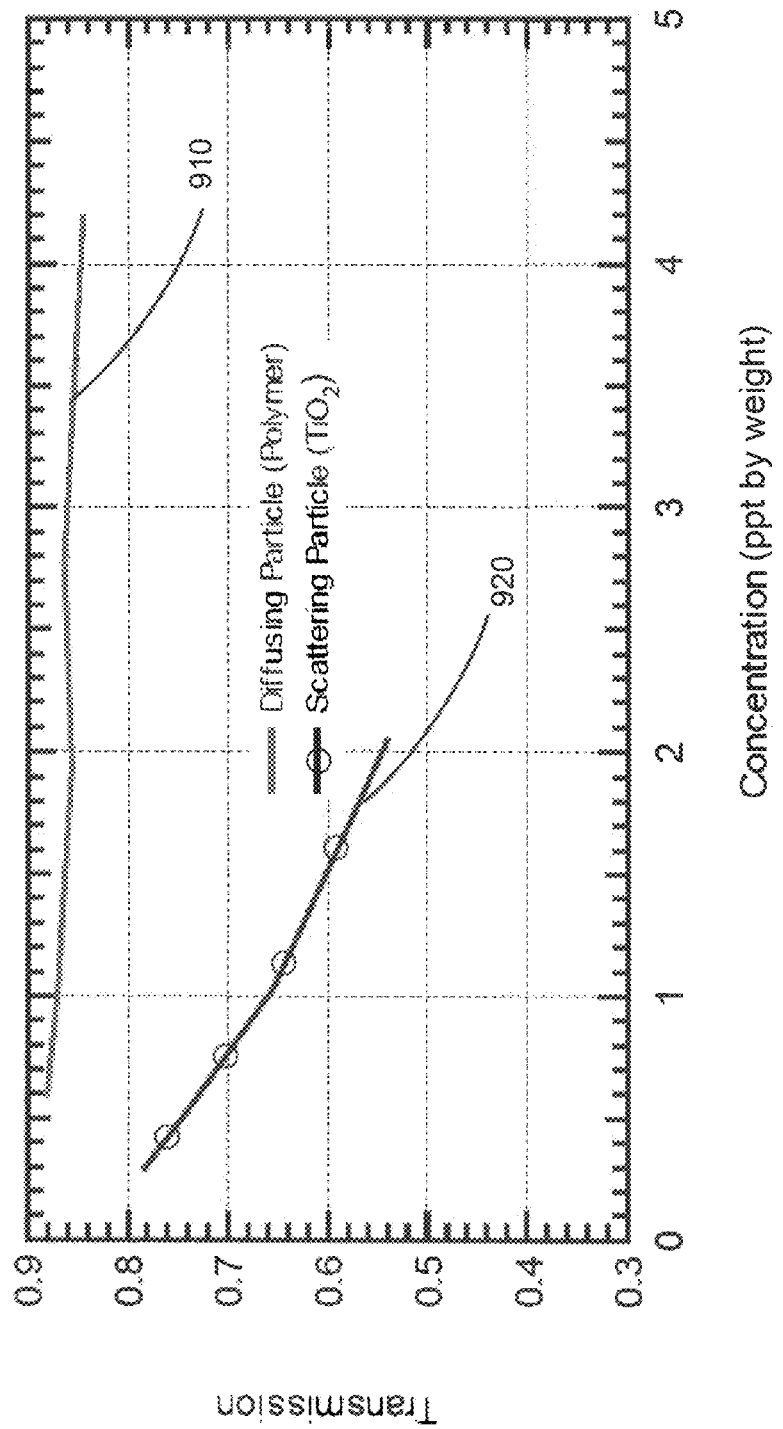
FIG. 9 shows a plot of transmission as a function of concentration for diffusing particles and for scattering particles.

The optical element 205 is made from a bulk matrix material such as a polymer, glass, crystal, or foam. The bulk matrix material is further embedded with a combination of two types of particles, a light diffusing particle and a light scattering particle. A light diffusing particle is a particle that generally redirects light in the forward direction, while a light scattering particle is a particle that generally redirects light in the backward direction with negligible light absorption. FIG. 9 shows a plot of two curves of transmission as a function of concentration for light diffusing particles (solid line 910) and for light scattering particles (solid line with circles 920). Because a light diffusing particle redirects light in the forward direction, the total transmission (measured, for example, with an integrating sphere) of a bulk material embedded with light diffusing particles remains fairly constant with increasing concentration of particles. In contrast, the transmission of a bulk material embedded with light scattering particles is sensitive to the concentration of the particles. In one embodiment, a light scattering particle can be defined as a particle that causes more than a 10% decrease in transmission with a corresponding increase in reflection for a five-fold increase in concentration of the particle. For example, air bubbles can act as scattering particles in the bulk matrix material foam.

In general, the diffusing particles have a refractive index that is close to the refractive index of the bulk matrix material, while the difference between the refractive index of the scattering particles and the refractive index of the bulk matrix material is larger than the difference between the refractive index of the diffusing particles and the refractive index of the bulk matrix material As a result, the diffusing particles diffuse the light that strikes the particles, essentially redirecting the light in a different but generally forward direction with negligible back scatter. In contrast, the scattering particles scatter light impinging on the particles in a generally backward direction. By using a combination of the two types of particles in a bulk matrix material, the light distribution can be controlled better and is less susceptible to variations in concentration of the particles. However, in some embodiments, only diffusing particles or only scattering particles are used in a bulk matrix material to redistribute light.

Figure 3:
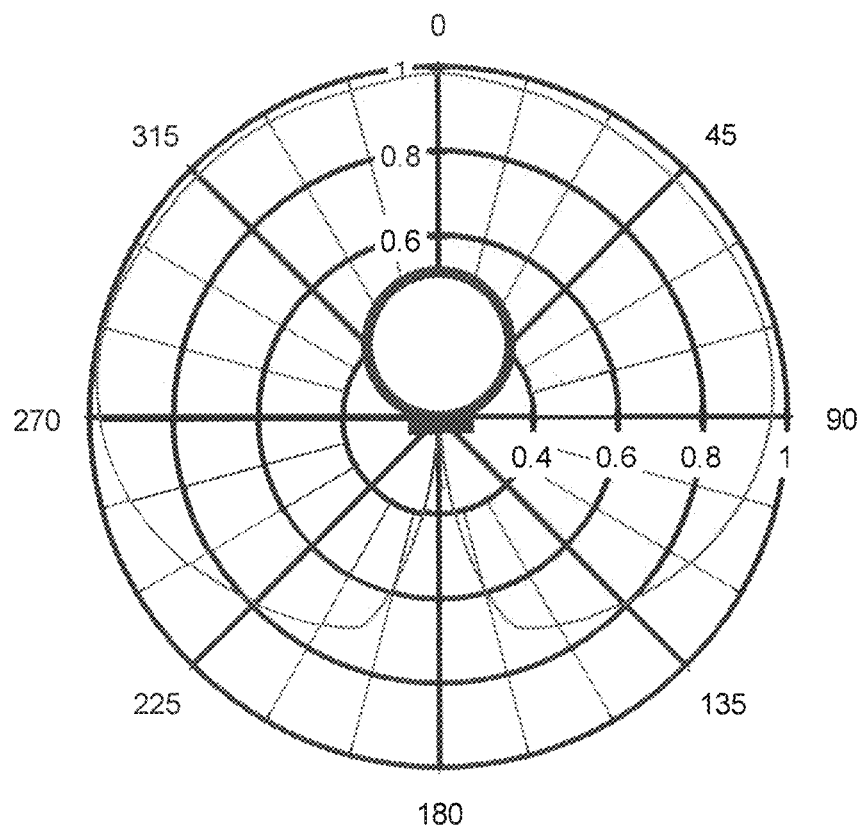
FIG. 3 shows an example distribution pattern of light re-emitted from an LED coupled to a spherical optical element containing two different types of suspended particles.

FIG. 3 shows an example spatial distribution of light re-emitted from an LED coupled to a spherical optical element 205 containing two different types of suspended particles. A spherical shape having a diameter of 60 mm was selected for the optical element to simulate the shape of the rounded portion of the A19 incandescent bulb. The ratio of the concentrations of the two types of particles present in the bulk matrix material controls the light distribution. The bulk matrix material for the sphere used to generate the light distribution shown in the example of FIG. 3 is a polymer having an index of refraction of 1.51. The diffusing particles embedded in the bulk matrix material have a bulk refractive index of 1.58 at a concentration of 3.75 parts per thousand (ppt) by weight with an average particle size of 8 microns, and the scattering particles embedded in the bulk matrix material have a bulk refractive index of 2.2 at a concentration of 0.06 ppt by weight with an average particle size of 0.25 microns. In one embodiment, the bulk matrix material is urethane, the diffusing particles are a styrenic polymer, and the scattering particles are titanium dioxide.

Figure 4:
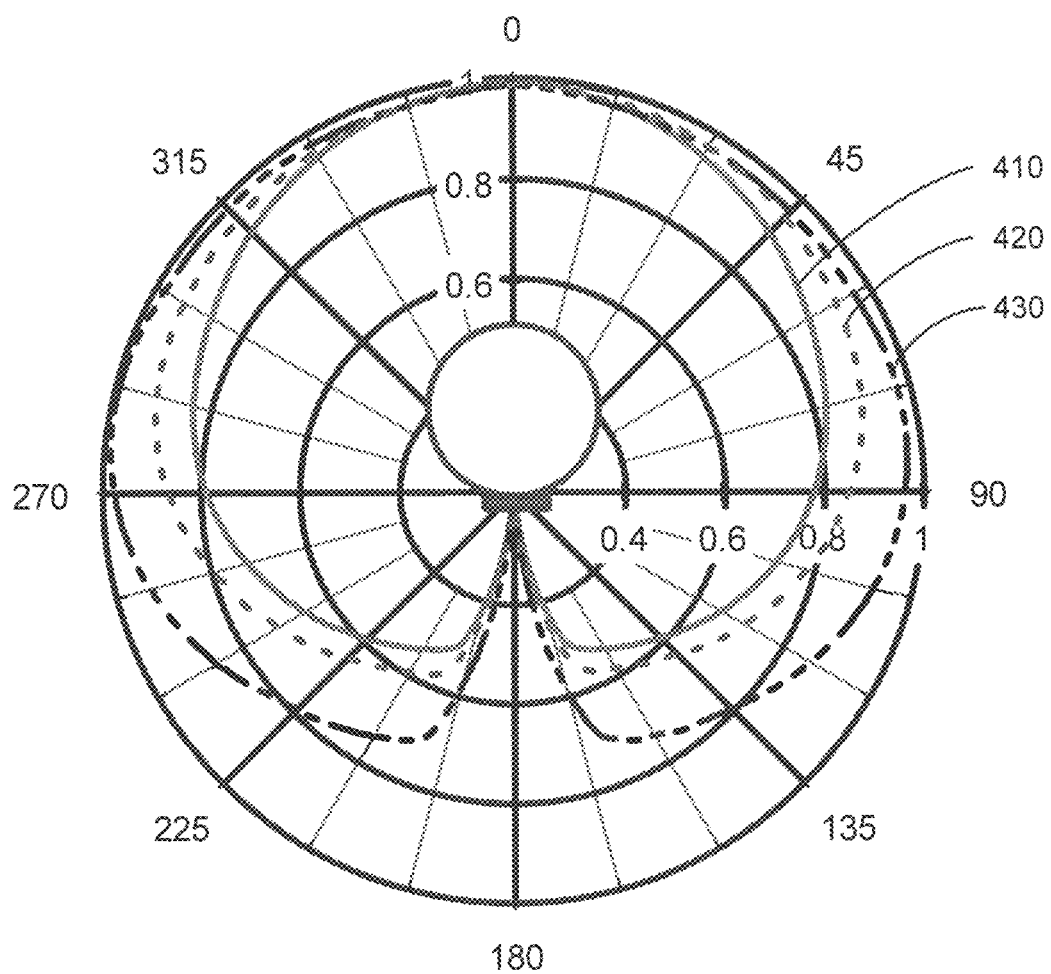
FIG. 4 shows three example distributions of re-emitted light from an optical element having embedded diffusing and scattering particles and coupled to an LED.

By changing the ratio of diffusing particles concentration (i.e., forward scattering particles) to (backward) scattering particles concentration, the angular distribution of light can be tuned. FIG. 4 shows three example distributions of light 410, 420, 430. The light emitted in the forward direction ($\theta$=0) for each of the light distributions 410, 420, 430 has been normalized to one to enable a comparison of the distributions. The relative amounts of light emitted to the sides and behind the light source are dependent upon the ratio of the diffusing particles concentration to the scattering particles concentrations. For light distribution 410, the ratio is 90:1 for light distribution 420, the ratio is 135:1; and for light distribution 430, the ratio is 70:1.

One metric of isotropic fidelity of the lighting apparatus with the optical element is the ratio of light emitted in a backward direction to light emitted in a forward direction. The forward direction is selected to be the direction normal to the plane of the LED die surface, that is, the direction in which the maximum amount of light is emitted from an unmodified LED. In an LED system, the emission in the backward direction tends to decrease monotonically, and the amount of light emitted sharply decreases as the backward angle approaches 180° from the normal (i.e., a direction opposite from the normal direction). It has been determined empirically that if the light at 120° from the forward normal axis has the same intensity as the normal axis (0°), the light distribution has a high degree of uniformity in all directions. As a result, the metric for light distribution uniformity, U, has been selected to be defined by:

$$U = \frac{\int_{-110°}^{-130°} I d\theta + \int_{110°}^{130°} I d\theta}{2\int_{-10°}^{10°} I d\theta}. \quad (1)$$

Thus, the light distribution uniformity is the integral of the intensity of light emitted at −120° and 120° from the forward normal axis over a 20-degree angular span centered at −120° and 120°, respectively, divided by twice the integral of the intensity of light emitted in the forward normal direction over a 20-degree angular span centered around the forward normal direction. A uniformity of 1.0 would represent a light distribution that is isotropic between 0° and ±120° from normal. For comparison, the light distribution uniformity equals zero for a surface mount LED having a Lambertian angular distribution, while the light distribution uniformity equals 1.2 for an incandescent light bulb. In one embodiment, a quasi-isotropic distribution of light is one that has light distribution uniformity between 0.6 and 1.4.

Figure 5:
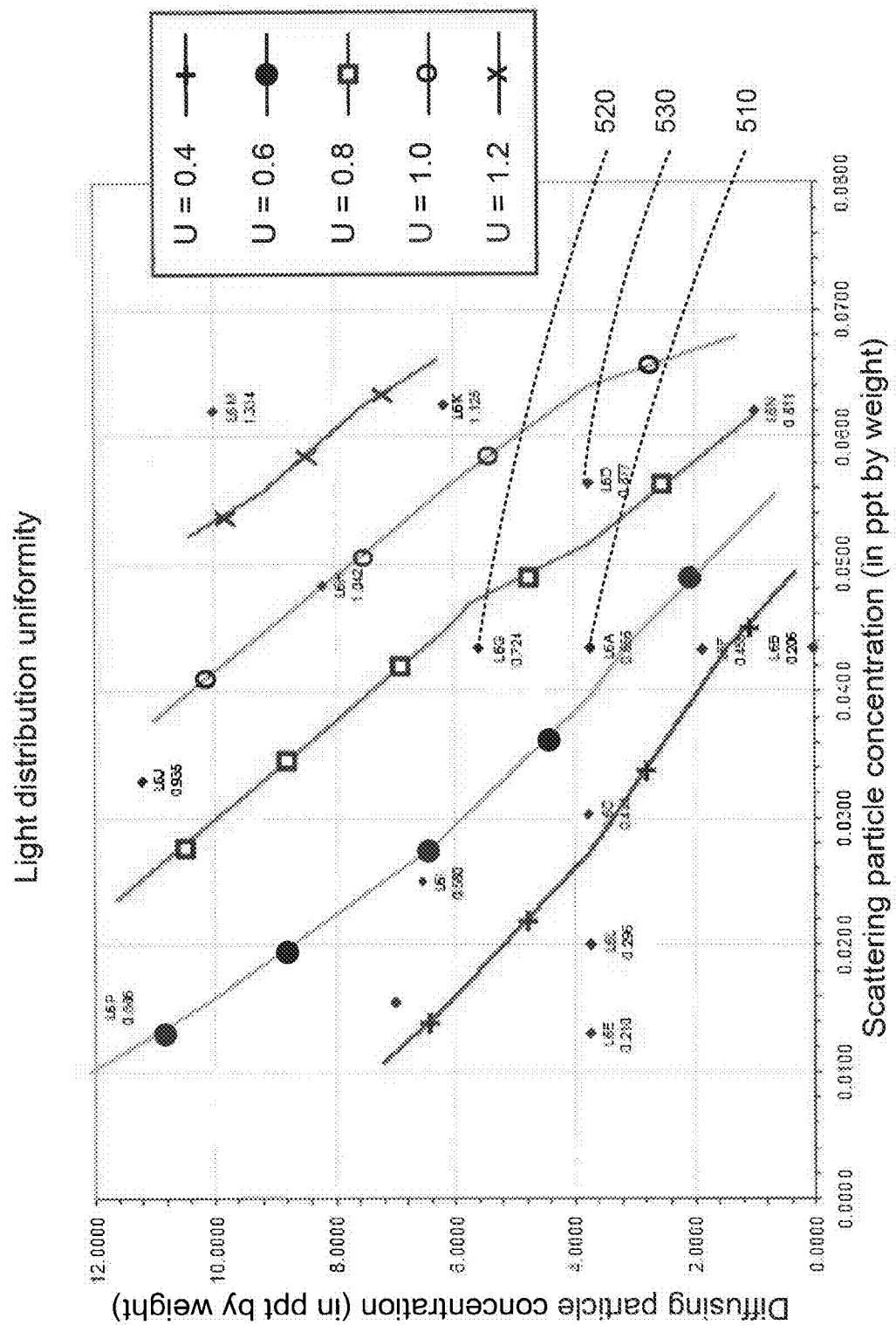
FIG. 5 shows a graph of light distribution uniformity as a function of concentration of diffusing particles and scattering particles.

Several spherical optical elements having a diameter of 60 mm with various concentrations of diffusing and scattering particles were produced. Each of the spherical optical elements was made from the same bulk matrix material and used the same types and dimensions of diffusing particles and scattering particles as discussed for the optical element used to produce the spatial light distribution shown in FIG. 3 above. Table 1 shows the concentration (ppt by weight) of diffusers and scatterers of the optical elements and a corresponding light distribution uniformity value, U, calculated from measured intensity values of the spheres. FIG. 5 shows the light distribution uniformity values, U, plotted as a function of the concentration of scattering particles in the optical element (shown on the x-axis) and the concentration of diffusing particles (shown on the y-axis). By interpolating between the light distribution uniformity values that were calculated for these spheres when placed over a white LED, lines of equal light distribution uniformity were determined and mapped in FIG. 5. The five mapped lines in FIG. 5 correspond to U values of 0.4, 0.6, 0.8, 1.0, and 1.2. The data points labeled 510, 520, 530 in FIG. 5 correspond to the spatial distribution curves labeled 410, 420, 430, respectively, in FIG. 4 One of the data points along the x-axis shows the uniformity value (0.21) for an optical sphere having a concentration of 0.04 ppt by weight of scattering particles and no diffusing particles.

TABLE 1

| Diffusers (ppt by weight) | Scatterers (ppt by weight) | U |
|---|---|---|
| 3.74 | 2.43 | 0.67 |
| 0.00 | 0.00 | 0.21 |
| 3.76 | 2.45 | 0.44 |
| 3.75 | 2.44 | 0.88 |
| 3.74 | 2.43 | 0.21 |
| 1.87 | 1.21 | 0.46 |
| 5.60 | 3.64 | 0.72 |
| 8.20 | 5.33 | 1.04 |
| 6.54 | 4.25 | 0.58 |
| 11.20 | 7.28 | 0.94 |
| 6.17 | 4.01 | 1.13 |
| 3.73 | 2.42 | 0.30 |
| 10.00 | 6.50 | 1.33 |
| 0.99 | 0.64 | 0.81 |
| 6.99 | 4.54 | 0.46 |

Another metric of performance of the lighting apparatus with the optical element is the transmission of the apparatus. Transmission is defined as the ratio of total light emitted from the lighting assembly with a light redistribution optical element divided by the total light emitted from the light source by itself, as shown in equation (2):

$$T = \frac{\int_{0°}^{360°} \int_{0°}^{180°} I_{element+LED} \sin\theta d\theta d\varphi}{\int_{0°}^{360°} \int_{0°}^{180°} I_{LED} \sin\theta d\theta d\varphi}. \quad (2)$$

Figure 6:
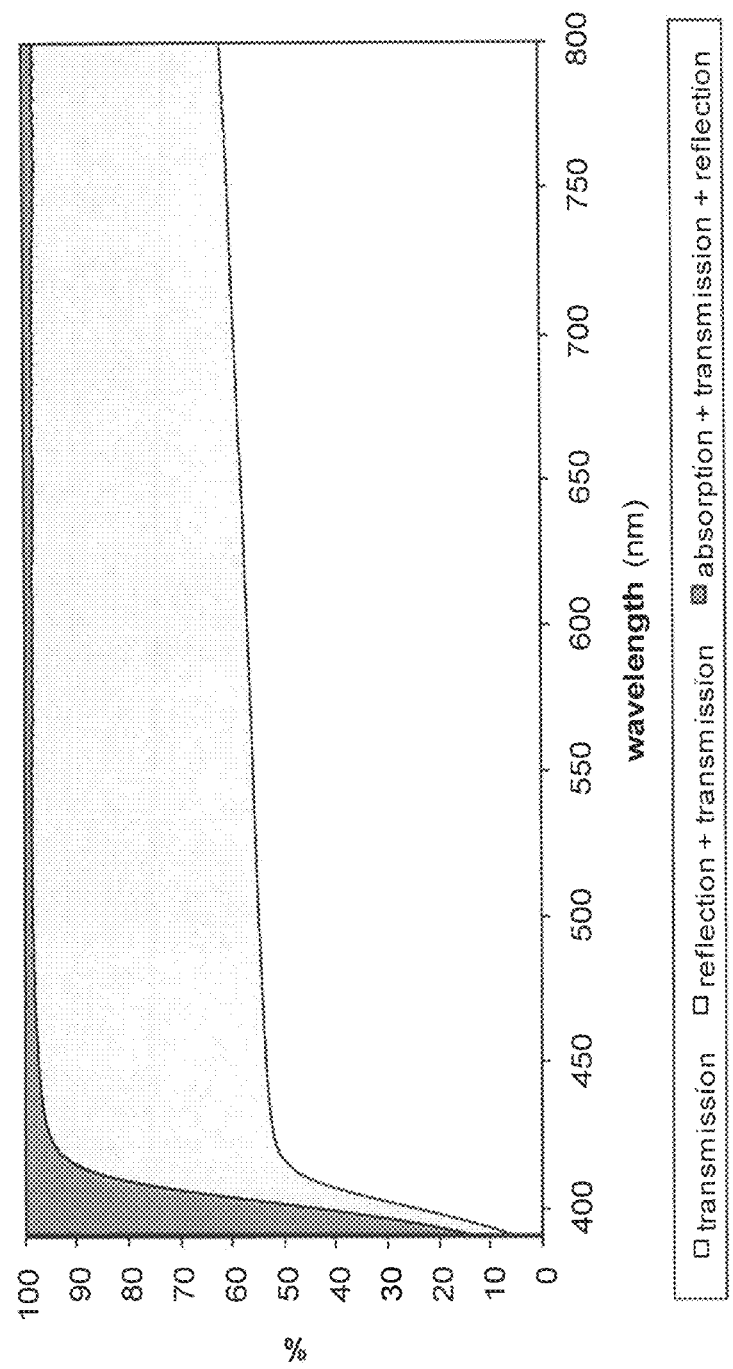
FIG. 6 shows a stacked area plot of the measured light transmitted through a sample of bulk matrix material and the reflected light from the sample.

FIG. 6 shows a stacked area plot of measurements of total transmission and total reflection performed on a 1 mm thick coupon of the same bulk material as used for the test spheres used to obtain the light distribution data shown in FIGS. 4 and 5. The coupon contained a concentration of 1.3 ppt by weight of titanium dioxide scattering particles without any diffusing particles. Light unaccounted for by transmission and reflection is depicted as absorption in FIG. 6. As shown in FIG. 6, the total amount of light lost through absorption in the visible wavelength spectrum is very low so that any light not transmitted is scattered backwards. Similar transmission and reflection measurements were obtained for a coupon that contained only diffusing particles. The losses in the visible wavelength range from the bulk matrix material and from the embedded particles were so low that the transmission measurements for the different spheres were nearly identical. When the optical element spheres are coupled to the LED die with an index-matching material having an index of refraction of 1.50, the transmission from the optical spheres is approximately 98%.

While the optical element used to redistribute the light emitted from an LED has been described above as having a spherical shape, other shapes can also be used to produce a desired angular light distribution.

The width of the chosen shape should be greater than the base that supports the LED. When the width condition is satisfied, the optical element reduces the amount of light redirected back towards the LED base and provides an escape path away from the base to provide illumination in a downward direction.

Additionally, while the light source discussed above has been described as an LED that has a Lambertian emission, the optical element can be used with an LED that has a different emission pattern or any other type of light source, such as lensed LEDs, organic LEDs, electroluminescent devices, field emission devices, or lasers. In one embodiment, the light source can be remote from the optical element. In one embodiment, the light source can emit electromagnetic radiation, where the emitted spectrum includes wavelengths in the electromagnetic spectrum where a bulk matrix material and diffusing particles are available to diffuse the emitted spectrum and scattering particles are available to scatter the emitted spectrum.

In one embodiment, the optical element embedded with diffusing particles and/or scattering particles can be used with a light source to create a substantially uniformly emitting planar surface. In another embodiment, the optical element can be used to generate isotropic light or light having a specified light distribution using a remote source, such as a laser.

Figure 7:
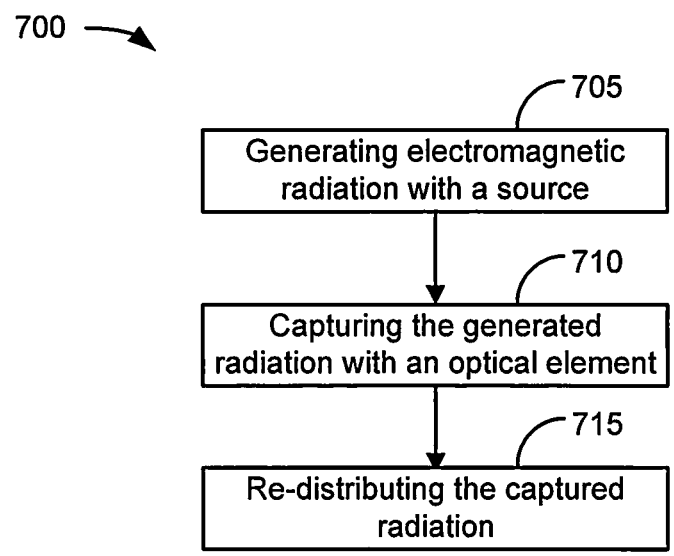
FIG. 7 is a flow diagram illustrating an example process of redistributing light emitted from a source.

FIG. 7 is a flow diagram illustrating an example process of modifying the distribution of electromagnetic radiation emitted from a source. At block 705, electromagnetic radiation is generated by a source. In one embodiment, the source can be a light source such as one or more LEDs or a laser, and the electromagnetic radiation can include visible light and/or other wavelengths of the electromagnetic spectrum.

Then at block 710, the generated electromagnetic radiation is captured with an optical element. In one embodiment, the generated light is captured with a spherical shaped optical element made from a bulk matrix material as described above.

At block 715, the captured radiation is re-distributed and emitted by the apparatus. In one embodiment, the captured radiation is re-distributed by diffusing particles and/or scattering particles embedded within the bulk matrix material of the optical element.

Figure 8:
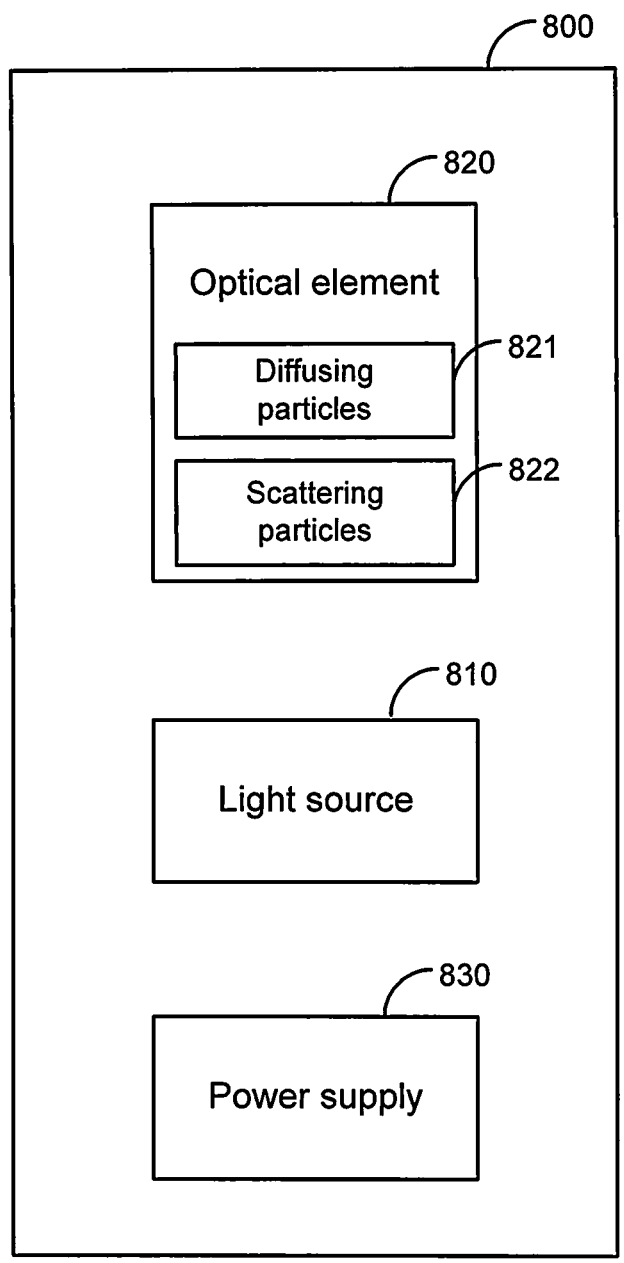
FIG. 8 shows an example block diagram of components of a lighting apparatus that has an optical element used to redistribute light emitted from a light source.

FIG. 8 shows an example block diagram of a lighting apparatus 800 that has an optical element 820 for redistributing the light emitted by a light source 810. The lighting apparatus can also include a power supply 830. The optical element 820 can include diffusing particles 821 and/or scattering particles 822.

The light source 810 generates the light that is redistributed by the optical element. Light sources that can be used include one or more LEDs, lasers, etc. The power supply for the light source can include, but is not limited to, a battery or power from a wall outlet.

The optical element 820 is a bulk matrix material, such as a polymer, glass, crystal, or foam. The optical element 820 can be any shape or size, such as a sphere that has the dimensions of the rounded portion of a typical incandescent light bulb. In one embodiment, the optical element 820 can include diffusing particles 821 embedded within the bulk material. Additionally or alternatively, the optical element 820 can include scattering particles 822 embedded within the bulk material. In one embodiment, the diffusing particles 821 and/or the scattering particles 822 are substantially uniformly distributed throughout the optical element 820. In one embodiment, the diffusing particles 821 and/or the scattering particles 822 can be distributed in particular concentrations within the optical element 820 to provide a desired angular redistribution of the light emitted by the light source 810.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while spherical optical elements are discussed, optical elements having any shape may be used under the principles disclosed herein. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:

1. A system, comprising:
a source configured to emit electromagnetic radiation having a first angular distribution pattern;
an optical element coupled to the source, wherein the optical element comprises a bulk material, a first type of particle substantially uniformly distributed throughout the bulk material, and a second type of particle substantially uniformly distributed throughout the bulk material, wherein the first type of particle has a first concentration by weight within the bulk material, and the second type of particle has a second concentration by weight within the bulk material, and further wherein the optical element has a shape that captures the first angular distribution pattern and emits a second angular distribution pattern;
wherein the first and second angular distribution patterns provide a light distribution pattern with a light distribution uniformity between 0.6 and 1.4, the light distribution uniformity is given by:

$$U = \frac{\int_{-110°}^{-130°} I d\theta + \int_{110°}^{130°} I d\theta}{2\int_{-10°}^{10°} I d\theta},$$

wherein I corresponds to emitted intensity in a given direction.

2. The system of claim 1, wherein the first type of particle is one or more type of scattering particles, and the second type of particle is one or more type of diffusing particles.

3. The system of claim 1, wherein the first angular distribution pattern does not emit radiation beyond a 180° arc in a plane passing through a center of and normal to the source, and further wherein the second angular distribution pattern emits radiation over at least a 180° arc in the plane passing through the center of and normal to the source.

4. The system of claim 1, wherein the optical element is remote from the light source.

5. The system of claim 1, wherein the optical element has a size and a shape substantially similar to a rounded portion of an A19 incandescent light bulb.

6. A system, comprising:
a light-emitting element;
an optical element coupled to the light emitting element, wherein the optical element is embedded substantially uniformly with a first type of particle without a gradient in concentration by weight of the first type of particle, the optical element is embedded substantially uniformly with a second type of particle without a gradient in concentration by weight of the second type of particle, and further wherein the optical element captures the light emitted by the light emitting element and re-emits the light in a distribution pattern that provides a light distribution pattern with a light distribution uniformity between 0.6 and 1.4, the light distribution uniformity is given by:

$$U = \frac{\int_{-110°}^{-130°} Id\theta + \int_{110°}^{130°} Id\theta}{2\int_{-10°}^{10°} Id\theta},$$

wherein I corresponds to emitted intensity in a given direction.

7. The system of claim 6, wherein the first type of particle is a scattering particle, and the second type of particle is a diffusing particle.

8. The system of claim 6, wherein the optical element is coupled to the light emitting element with a material having a refractive index that substantially matches a refractive index of the optical element.

9. The system of claim 6, wherein the optical element is spherical.

10. The system of claim 9, wherein a diameter of the spherical optical element is greater than a width of a base supporting the light emitting element.

11. The system of claim 6, wherein the light emitting element is a light emitting diode.

12. The system of claim 6, wherein the light emitting element is a laser.

13. A system, comprising:
a light-emitting element;
a solid optical element coupled to the light emitting element, wherein the optical element is formed from a bulk material, the bulk material is embedded throughout with a first type of particle, the bulk material is embedded throughout with a second type of particle, and further wherein the optical element captures the light emitted by the light emitting element and re-emits the light in a quasi-isotropic distribution pattern;
wherein the quasi-isotropic distribution pattern has a light distribution uniformity between 0.6 and 1.4, and further wherein the light distribution uniformity is given by $$U = \frac{\int_{-110°}^{-130°} Id\theta + \int_{110°}^{130°} Id\theta}{2\int_{-10°}^{10°} Id\theta},$$

wherein I corresponds to emitted intensity in a given direction.

14. A method of simulating a light emission distribution of an incandescent light bulb, comprising:
generating light with a light-emitting diode (LED), wherein the LED only emits light in a forward direction;
capturing the generated light with an optical element embedded substantially uniformly with a first type of particle having a first concentration by weight within the solid optical element
re-emitting at least some of the captured light in a distribution pattern, wherein the distribution pattern includes emission in a backward direction outside the solid optical element;
wherein the distribution pattern has a light distribution uniformity between 0.6 and 1.4, the light distribution uniformity is given by:

$$U = \frac{\int_{-110°}^{-130°} Id\theta + \int_{110°}^{130°} Id\theta}{2\int_{-10°}^{10°} Id\theta},$$

wherein I corresponds to emitted intensity in a given direction.

15. The method of claim 14, wherein the optical element is further embedded substantially uniformly with a second type of particle having a second concentration by weight within the optical element.

16. The method of claim 15, wherein the first type of particle is a scattering particle, and the second type of particle is a diffusing particle.

17. The method of claim 14 wherein the optical element is spherical.

18. The method of claim 17, wherein the LED is mounted on a base, and further wherein a diameter of the spherical optical element is greater than a width of the base.

19. The method of claim 14, wherein the LED has a substantially Lambertian emission.

20. A method of simulating a light emission distribution of an incandescent light bulb, comprising:
generating light with a light emitting element, wherein the light emitting element only emits light in a forward direction;
means for capturing the generated light with an optical element, wherein a first type of particle and a second type of particle are distributed substantially uniformly without a gradient in concentration throughout the optical element;
means for re-emitting at least some of the captured light in a distribution pattern, wherein the distribution pattern includes emission in a backward direction; and
wherein the distribution pattern has a light distribution uniformity between 0.6 and 1.4, the light distribution uniformity is given by:

$$U = \frac{\int_{-110°}^{-130°} Id\theta + \int_{110°}^{130°} Id\theta}{2\int_{-10°}^{10°} Id\theta},$$

wherein I corresponds to emitted intensity in a given direction.

21. A method of changing a distribution of emitted electromagnetic radiation from a source, comprising:
generating electromagnetic radiation with a source;
capturing the generated radiation with an optical element embedded with a first type of particle substantially uniformly distributed throughout the optical element without a gradient in concentration, and further wherein the optical element is embedded throughout with a second type of particle substantially uniformly throughout the entire optical element without a gradient in concentration;

re-emitting at least some of the captured light in a distribution pattern, wherein the distribution pattern is substantially uniform over a surface; and wherein the distribution pattern has a light distribution uniformity between 0.6 and 1.4, the light distribution uniformity is given by:

$$U = \frac{\int_{-110°}^{-130°} I d\theta + \int_{110°}^{130°} I d\theta}{2\int_{-10°}^{10°} I d\theta},$$

wherein I corresponds to emitted intensity in a given direction.

22. The system of claim 21, wherein the first type of particle is a scattering particle, and the second type of particle is a diffusing particle.

23. An apparatus, comprising:
a solid optical element formed from a bulk material, wherein the optical element has a shape that captures electromagnetic radiation emitted from a source in a first angular distribution pattern and re-distributes the electromagnetic radiation in a second angular distribution pattern;
a plurality of scattering particles, wherein the plurality of scattering particles are dispersed substantially uniformly throughout the bulk material, wherein the scattering particles have a first concentration by weight within the bulk material; and
a plurality of diffusing particles, wherein the plurality of diffusing particles are dispersed substantially uniformly with a second concentration by weight throughout the bulk material, wherein the diffusing particles have a second concentration by weight within the bulk material;

wherein the first and second angular distribution patterns provide a light distribution pattern with a light distribution uniformity between 0.6 and 1.4, the light distribution uniformity is given by $$U = \frac{\int_{-110°}^{-130°} I d\theta + \int_{110°}^{130°} I d\theta}{2\int_{-10°}^{10°} I d\theta},$$

wherein I corresponds to emitted intensity in a given direction.

24. A system, comprising:
a source configured to emit electromagnetic radiation having a first angular distribution pattern;
a solid optical element coupled to the source, wherein the optical element is formed from a bulk material, and a first type of particle is distributed with a first concentration by weight throughout the bulk material, and a second type of particle is distributed with a second concentration by weight throughout the bulk material and further wherein the optical element has a shape that captures the first angular distribution pattern and emits a second angular distribution pattern; wherein the first and second angular distribution patterns provide a light distribution pattern with a light distribution uniformity between 0.6 and 1.4, and further wherein the light distribution uniformity is given by $$U = \frac{\int_{-110°}^{-130°} I d\theta + \int_{110°}^{130°} I d\theta}{2\int_{-10°}^{10°} I d\theta},$$

wherein I corresponds to emitted intensity in a given direction.

* * * * *